United States Patent
Kim et al.

(10) Patent No.: US 10,153,881 B2
(45) Date of Patent: Dec. 11, 2018

(54) CHANNEL STATE INFORMATION TRANSMISSION/RECEPTION METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Younsun Kim, Seongnam-si (KR); Juho Lee, Suwon-si (KR); Hyojin Lee, Suwon-si (KR); Joonyoung Cho, Suwon-si (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/675,334

(22) Filed: Aug. 11, 2017

(65) Prior Publication Data

US 2017/0346612 A1 Nov. 30, 2017

Related U.S. Application Data

(63) Continuation of application No. 15/137,779, filed on Apr. 25, 2016, now Pat. No. 9,735,936, which is a
(Continued)

(51) Int. Cl.
*H04L 5/00* (2006.01)
*H04W 24/10* (2009.01)
(Continued)

(52) U.S. Cl.
CPC ......... *H04L 5/0048* (2013.01); *H04B 7/0413* (2013.01); *H04B 7/0478* (2013.01);
(Continued)

(58) Field of Classification Search
CPC ... H04L 5/0048; H04L 5/0023; H04L 5/0057; H04W 24/10; H04B 7/0413; H04B 7/0452; H04B 7/0456; H04B 7/0619
See application file for complete search history.

(56) References Cited

U.S. PATENT DOCUMENTS

| | | | |
|---|---|---|---|
| 2013/0072125 A1 | 3/2013 | Yoon et al. | |
| 2013/0100922 A1* | 4/2013 | Ahn | H04B 7/0639 370/329 |

(Continued)

FOREIGN PATENT DOCUMENTS

WO 2011-162936 A1 12/2011

OTHER PUBLICATIONS

Alcatel-Lucent Shanghai Bell, Alcatel-Lucent, Considerations on CSI Feedback Enhancements for High-priority Antenna Configuration, R1-112420, 3GPP TSG-RAN WG1 #66, Aug. 22-26, 2011, Athens, Greece (Continued)

*Primary Examiner* — Habte Mered
(74) *Attorney, Agent, or Firm* — Jefferson IP Law, LLP

(57) ABSTRACT

A method and an apparatus for transmitting/receiving channel state information for use in multi-antenna system are provided. A signal communication method of a base station having a plurality of antennas in a wireless communication system includes determining antenna ports of first and second directions based on directions of the plurality of antennas, allocating channel measurement resources for the respective antenna ports to a terminal, transmitting a feedback configuration to the terminal according to the channel measurement resources, and receiving feedback information from the terminal based on the channel measurement resource and the feedback configuration. The signal transmission/reception method and apparatus are advantageous (Continued)

in transmitting/receiving channel state information efficiently in the system using a plurality of antennas.

24 Claims, 12 Drawing Sheets

Related U.S. Application Data continuation of application No. 13/915,044, filed on Jun. 11, 2013, now Pat. No. 9,326,176.

(60) Provisional application No. 61/658,033, filed on Jun. 11, 2012.

(51) Int. Cl.
*H04B 7/0413* (2017.01)
*H04B 7/0456* (2017.01)
*H04B 7/06* (2006.01)
*H04B 7/0452* (2017.01)

(52) U.S. Cl.
CPC ........... *H04B 7/063* (2013.01); *H04B 7/0626* (2013.01); *H04B 7/0632* (2013.01); *H04L 5/0023* (2013.01); *H04L 5/0057* (2013.01); *H04W 24/10* (2013.01); *H04B 7/0452* (2013.01); *H04B 7/0456* (2013.01); *H04B 7/0619* (2013.01)

(56) References Cited

U.S. PATENT DOCUMENTS

| | | |
|---|---|---|
| 2013/0230081 A1 | 9/2013 | Wernersson et al. |
| 2013/0294352 A1* | 11/2013 | Park ................. H04B 7/024 370/328 |
| 2013/0308714 A1 | 11/2013 | Xu et al. |
| 2013/0322288 A1 | 12/2013 | Zhang et al. |
| 2014/0078919 A1* | 3/2014 | Hammarwall ........ H04L 5/0057 370/252 |
| 2015/0078472 A1* | 3/2015 | Vook .................. H04B 7/0617 375/267 |
| 2015/0080046 A1 | 3/2015 | Liu et al. |
| 2017/0111899 A1* | 4/2017 | Pan .................. H04W 72/0413 |
| 2017/0155435 A1* | 6/2017 | Zhu .................... H04B 7/0456 |

OTHER PUBLICATIONS

Samsung, CoMP RRC Parameters, R1-122243, 3GPP TSG RAN WG1 #69, May 21-25, 2012, Prague, Czech Republic.
Panasonic, CSI Feedback Configuration, Triggering, and Behaviour, R1-122188, 3GPP TSG RAN WG1 #69, May 21-25, 2012, Prague, Czech Republic.
Huawei, Hisilicon, Details of CSI-RS Based Received Signal Quality Measurements, R1-121949, 3GPP TSG RAN WG1 #69, May 21-25, 2012, Prague, Czech Republic.
NTT Docomo, Ericsson, ST-Ericsson, Samsung, CSI RS Configuration to Support 4 Tx MIMO UE in 8 Tx Networks, R1-110861, 3GPP TSG RAN WG1 Meeting #64, Feb. 21-25, 2011, Taipei, Taiwan.

* cited by examiner

CHANNEL STATE INFORMATION TRANSMISSION/RECEPTION METHOD AND APPARATUS FOR USE IN WIRELESS COMMUNICATION SYSTEM

PRIORITY

This application is a continuation application of a prior application Ser. No. 15/137,779, filed on Apr. 25, 2016, which has issued as U.S. Pat. No. 9,735,936 on Aug. 15, 2017, and which is a continuation application of prior application Ser. No. 13/915,044, filed on Jun. 11, 2013, which issued as U.S. Pat. No. 9,326,176 on Apr. 26, 2016, and which claims the benefit under 35 U.S.C. § 119(e) of a U.S. provisional patent application filed on Jun. 11, 2012 in the U.S. Patent and Trademark Office and assigned Ser. No. 61/658,033, the entire disclosure of each of which is hereby incorporated by reference.

BACKGROUND OF THE INVENTION

1. Field of the Invention

The present invention relates to a method and an apparatus for channel state information transmission/reception. More particularly, the present invention relates to a method and an apparatus for transmitting/receiving channel state information in multi-antenna system.

2. Description of the Related Art

A Reference Signal (RS) is a signal used for measuring the channel state (or quality) between the base station and users by taking notice of a signal strength or distortion, an interference strength, and Gaussian noise to help demodulating and decoding the data symbol at the receiver. Another use of the reference signal is to measure the radio channel state. The receiver measures the received signal strength of the reference signal transmitted at the negotiated transmission power level on the radio channel. The radio channel state determined in this way is used in order for the receiver to determine the data rate to be requested to the transmitter.

The next generation wireless mobile communication system standards, such as the 3rd Generation Partnership Project (3GPP), the Long Term Evolution Advanced (LTE-A) and the Institute of Electrical and Electronics Engineers (IEEE) 802.16m adopt a multicarrier-based multiple access technique, such as Orthogonal Frequency Division Multiplexing/Orthogonal Frequency Division Multiple Access (OFDM/OFDMA). In the case of the wireless mobile communication system adopting multicarrier-based multiple access, the channel estimation and measurement performance varies depending on the positions and number of symbols and subcarriers in time and frequency domains. Furthermore, the channel estimation and measurement performance are influenced by the power level allocated for the reference signal. Accordingly, as the resource amount (i.e., time, frequency, and transmission power) allocated for the reference signal increases, the channel estimation and measurement performance are improved, resulting in improvement of demodulation and decoding performance of the received data symbol and channel state measurement accuracy.

In the typical mobile communication system operating with a limited radio resource (i.e., time, frequency, and transmission power), however, if a large amount of radio resource is allocated for reference signal transmission, the radio resource amount for data transmission decreases. For this reason, the radio resource allocation for reference signal transmission has to be determined in consideration of the system throughput. More particularly, in a Multiple Input Multiple Output (MIMO) system for multi-antenna transmission, the resource allocation for reference signal and measurement of resource signal are very important technical factors.

Therefore, a need exists for a method and an apparatus for transmitting channel state information efficiently.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting channel state information efficiently.

Another aspect of the present invention is to provide a method and an apparatus for transmitting/receiving channel state information efficiently in a system using a plurality of antennas.

In accordance with an aspect of the present invention, a signal communication method of a base station having a plurality of antennas in a wireless communication system is provided. The method includes determining antenna ports of first and second directions based on directions of the plurality of antennas, allocating channel measurement resources for the respective antenna ports to a terminal, transmitting a feedback configuration to the terminal according to the channel measurement resources, and receiving feedback information from the terminal based on the channel measurement resource and the feedback configuration.

In accordance with another aspect of the present invention, a signal communication method of a terminal in a wireless communication system is provided. The method includes receiving channel measurement resources allocated for antenna ports formed in first and second directions determined based on directions of a plurality of antennas, receiving a feedback configuration according to the channel measurement resources, and transmitting feedback information measured based on the channel measurement resource and the feedback information.

In accordance with another aspect of the present invention, a base station of a wireless communication system is provided. The base station includes a transceiver having a plurality of antennas, and a control unit, for controlling the transceiver, for determining antenna ports of first and second directions based on directions of the plurality of antennas, for allocating channel measurement resources for the respective antenna ports to a terminal, for transmitting a feedback configuration to the terminal according to the channel measurement resources, and for receiving feedback information from the terminal based on the channel measurement resource and the feedback configuration.

In accordance with another aspect of the present invention, a terminal of a wireless communication system is provided. The terminal includes a transceiver for transmitting and receiving to and from a base station having a plurality of antennas, and a control unit, for controlling the transceiver, for receiving channel measurement resources allocated for antenna ports formed in first and second directions determined based on directions of a plurality of antennas and a feedback configuration according to the channel measurement resources, and for transmitting feedback information measured based on the channel measurement resource and the feedback information.

The present invention is advantageous in transmitting/receiving channel state information efficiently in the system using a plurality of antennas.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
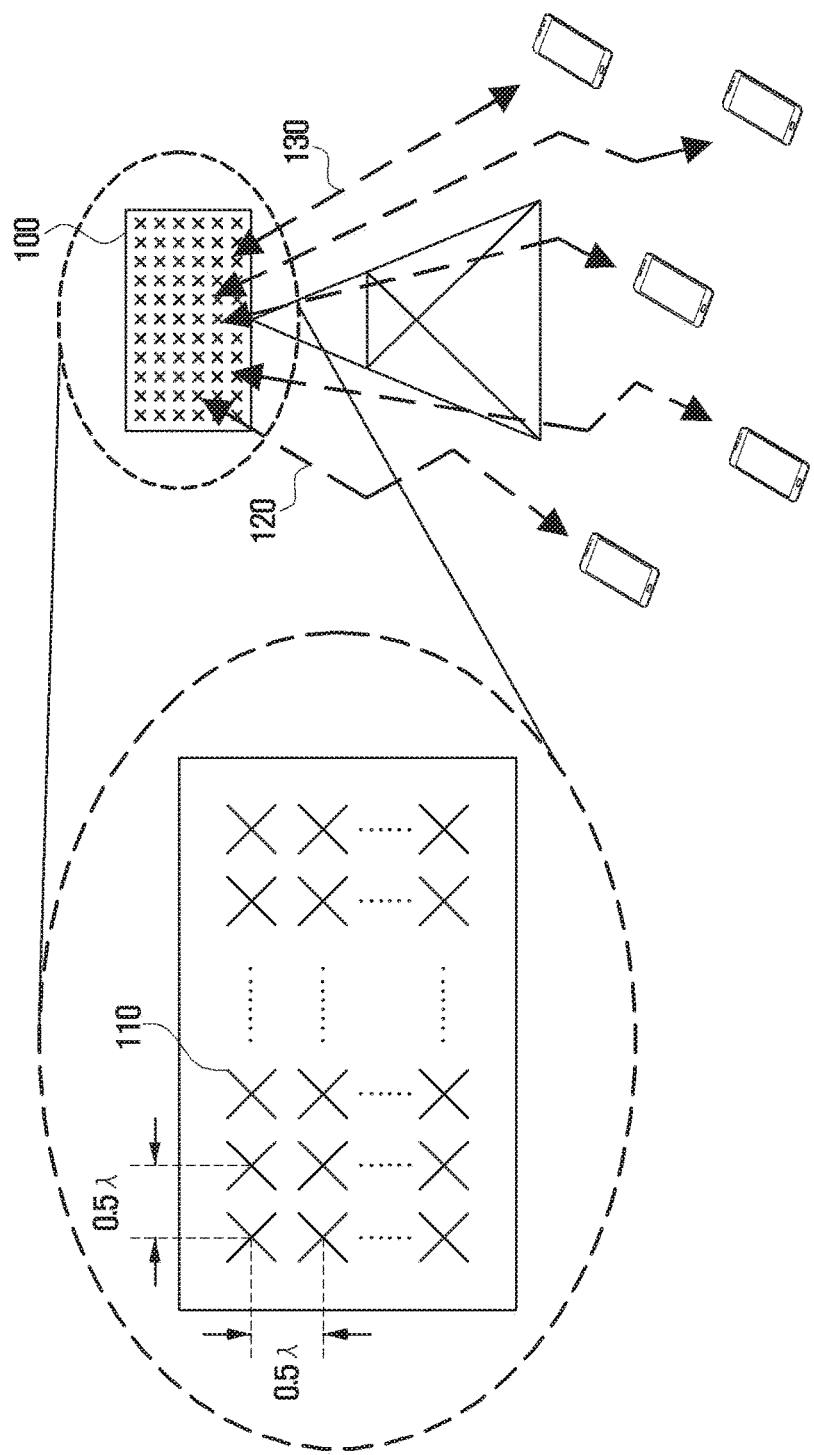
FIG. 1 is a diagram illustrating a Full Dimension-Multiple Input Multiple Output (FD-MIMO) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the following description is directed to an Orthogonal Frequency Division Multiplexing (OFDM)-based radio communication system, particularly the 3rd Generation Partnership Project (3GPP) and an Evolved Universal Terrestrial Radio Access (EUTRA), it will be understood by those skilled in the art that exemplary embodiments of the present invention can be applied even to other communication systems having similar technical background and channel format, with a slight modification, without departing from the spirit and scope of the present invention.

Exemplary embodiments of the present invention relate to a method for transmitting channel state information from the base station to the terminal for use in channel quality measurement in the radio mobile communication system adopting a multi-carrier multiple access scheme, such as Orthogonal Frequency Division Multiple Access (OFDMA).

The mobile communication system has evolved into a high-speed, high-quality wireless packet data communication system to provide data and multimedia services beyond the early voice-oriented services. In order to fulfil the requirements for such services, the standard organizations, such as 3GPP, 3GPP2, and the Institute of Electrical and Electronics Engineers (IEEE), are in the middle of standardization of multicarrier-based multiple access next generation mobile communication system. Recently, various mobile communication standards, such as Long Term Evolution (LTE) of 3GPP, Ultra Mobile Broadband (UMB) of 3GPP2, and 802.16m of IEEE, have been developed to support the high-speed, high-quality wireless packet data communication services.

The 3G-evolved mobile communication systems of the related art, such as LTE, UMB, and 802.16m, are designed based on the multicarrier multiple access scheme. In addition, the 3G evolved mobile communication systems adopt various technologies including Multiple Input Multiple Output (MIMO), beamforming, Adaptive Modulation and Coding (AMC), channel-Sensitive scheduling, etc. Such technologies are capable of concentrating a transmission power to certain antennas or adjusting the transmission data amount so as to increase the data transmission amount for good channel condition, resulting in improvement of system throughput. Since most of these techniques operate based on the channel state information between a Base Station (BS) or an evolved Node B (eNB) and a terminal (i.e., a User Equipment (UE) or a Mobile Station (MS)), the base station or the terminal has to measure the channel state and, at this time, the Channel Status Information Reference Signal (CSI-RS) is used for channel state measurement. The aforementioned base station denotes a device for transmitting in downlink and receiving in uplink, and a base station manages multiple cells for transmission/reception. The mobile communication system includes a plurality of base stations distributed geometrically, and each base station performs transmission/reception in a plurality of cells.

The 3G and 4G mobile communication systems of the related art, such as an LTE/LTE-Advanced (LTE-A) system, adopt MIMO technology to improve the data rate and system throughput. The MIMO technique includes transmitting a plurality of information streams separated spatially using multiple transmit/receive antennas. This technique of transmitting spatially separated multiple information streams is referred to as spatial multiplexing. Typically, the number of information streams for spatial multiplexing is determined depending on the numbers of transmit and receive antennas. Typically, the number of information streams that can be spatially multiplexed is referred to as a rank of the corresponding transmission. In the MIMO technique supported by the LTE/LTE-A Release 11, the spatially multiplexing is up to 8 transmit/receive antennas, and this means that the transmission rank is supported up to 8.

The massive MIMO or Full Dimension MIMO (FD-MIMO) system adopting the technology proposed in exemplary embodiments of the present invention supports 32 or more transmit antennas as compared to the legacy LTE/LTE-A MIMO technique supporting up to 8 transmit antennas. However, exemplary embodiments of the present invention are not limited thereto.

FIG. 1 is a diagram illustrating an FD-MIMO system according to an exemplary embodiment of the present invention. The FD-MIMO system is a radio communication system for transmitting data using a few dozen or more transmit antennas.

Referring to FIG. 1, a base station transmitter 100 transmits radio signals 120 and 130 through a few dozen or more transmit antennas. Transmit antennas 110 are arranged at a minimum distance among each other. The minimum distance may be half of the wavelength ($\lambda/2$). Typically, in the case that the transmit antennas are arranged at the distance of half of the wavelength of the radio signal, the signals transmitted by the respective transmit antennas are influenced by radio channel with low correlation. Assuming a radio signal band of 2 GHz, this distance is 7.5 cm and shortened as the band becomes higher than 2 GHz.

In FIG. 1, a few dozen or more transmit antennas 110 arranged at the base station are used to transmit signals 120 and 130 to one or more terminals. In order to transmit signals to a plurality of terminals simultaneously, an appropriated precoding is applied. At this time, one terminal may receive a plurality of information streams. Typically, a number of information streams which a terminal can receive is determined depending on the number of receive antennas of the terminal, a channel state, and a reception capability of the terminal.

In order to implement the FD-MIMO system efficiently, the terminal has to measure the channel condition and interference size accurately and transmit the channel state information to the base station efficiently. If the channel state information is received, the base station determines the terminals for downlink transmission, downlink data rate, and precoding to be applied. In the case of FD-MIMO system using a large number of transmit antennas, if the channel state information transmission method of the legacy LTE/LTE-A system is applied without modification, the control information amount to be transmitted in uplink increases significantly, resulting in uplink overhead.

In order to transmit information from the transmitter to the receiver in the mobile communication system, a resource, such as time, frequency, and transmission power is used. The frequency and power are limited resources. Accordingly, if the resource allocated for a reference signal increases, the resource amount to be allocated for data traffic channel transmission decreases, resulting in reduction of data transmission amount. In this case, although the channel estimation and measurement performance are improved, the data transmission amount decreases, resulting in reduction of an entire system throughput. Thus, it is necessary to adjust the resource allocation amount for a reference signal and a traffic channel transmission appropriately.

Figure 2:
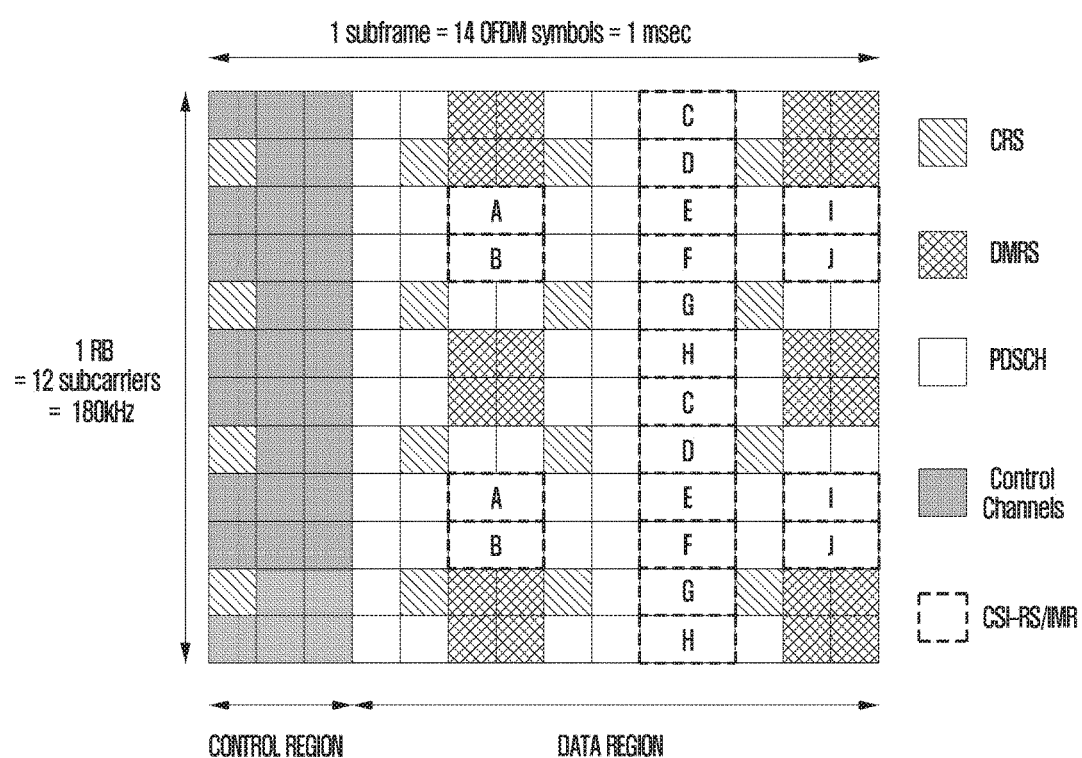
FIG. 2 is a time-frequency grid illustrating a single resource block of a downlink subframe as a smallest scheduling unit in a Long Term Evolution (LTE/LTE-Advanced (LTE-A) system according to an exemplary embodiment of the present invention.

FIG. 2 is a time-frequency grid illustrating a single resource block of a downlink subframe as a smallest scheduling unit in a LTE/LTE-A system according to an exemplary embodiment of the present invention. In the LTE system, a subframe consists of a plurality of resource blocks.

Referring to FIG. 2, one of a plurality of resource blocks included in a subframe is illustrated. The radio resource is of one subframe in the time domain and one RB in the frequency domain. The radio resource consists of 12 subcarriers in the frequency domain and 14 OFDM symbols in the time domain, i.e., 168 unique frequency-time positions. In the LTE/LTE-A system, each frequency-time position is referred to as a Resource Element (RE).

The radio resource structured as shown in FIG. 2 can be used for transmitting a plurality of different types of signals as follows.

1. A Cell-specific Reference Signal (CRS): a reference signal transmitted to all the UEs within a cell.

2. A Demodulation Reference Signal (DMRS): a reference signal transmitted to a specific UE.

3. A Physical Downlink Shared Channel (PDSCH): a data channel transmitted in downlink which the eNB use to transmit data to the UE and mapped to REs not used for reference signal transmission in data region of FIG. 2.

4. A Channel Status Information Reference Signal (CSI-RS): a reference signal transmitted to the UEs within a cell and used for channel state measurement. Multiple CSI-RSs can be transmitted within a cell.

5. Other control channels (i.e., a Physical Hybrid Automatic Repeat reQuest (HARQ) Indicator Channel (PHICH), a Physical Control Format Indicator Channel (PCFICH), a Physical Control Channel (PDCCH), and the like): channels for providing a control channel used for the UE to receive PDCCH and transmitting an ACKnowledgement/Non-ACKnowledgement (ACK/NACK) of a HARQ operation for uplink data transmission.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of number of antennas transmitting CSI-RS. In addition, the zero power CSI-RS (muting) can be mapped to some of the positions A, B, C, D, E, F, G, H, I, and J. The CSI-RS can be mapped to 2, 4, or 8 REs according to the number of the antenna ports for transmission.

For two antenna ports, half of a specific pattern is used for CSI-RS transmission, for four antenna ports, all of the specific pattern is used for CSI-RS transmission, and for eight antenna ports, two patterns are used for CSI-RS transmission. Meanwhile, muting is always performed by pattern. For example, although the muting may be applied to a plurality of patterns, if the muting positions mismatch CSI-RS positions, it cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB.

The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. For example, the UE measures the reference signal transmitted by the eNB in downlink and feeds back the information estimated from the reference signal to the eNB in the format defined in the LTE/LTE-A standard. In the LTE/LTE-A system, the UE feedback information includes the following three indicators:

1. A Rank Indicator (RI): a number of spatial layers that can be supported by the current channel experienced at the UE.
2. A Precoding Matrix Indicator (PMI): a precoding matrix recommended by the current channel experienced at the UE.
3. A Channel Quality Indicator (CQI): a maximum possible data rate that the UE can receive signal in the current channel state. A CQI may be replaced with the Signal Interference to Noise Ratio (SINR), a maximum error correction code rate and modulation scheme, or per-frequency data efficiency that can be used in similar way to the maximum data rate.

The RI, PMI, and CQI are associated among each other in meaning. For example, the precoding matrix supported in LTE/LTE-A is configured differently per rank. Accordingly, the PMI value 'X' is interpreted differently for the cases of RI set to 1 and RI set to 2. In addition, when determining CQI, the UE assumes that the PMI and RI which it has reported is applied by the eNB. For example, if the UE reports RI_X, PMI_Y, and CQI_Z, the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, a CSI Process is defined as a means for configuring the channel state information, such as CQI, RI, and PMI to the UE. The CSI process includes a CSI-RS and an Interference Measurement Resource (IMR). The eNB is capable of configuring at least one CSI-RS per UE, and the UE measures the CSI-RS designated in the CSI process to calculate the received signal strength passed the channel and measures the IMR to calculate the strength of interference influencing the received signal. The IMR is the radio resource configured separately for interference measurement of the UE such that the UE assumes all signals received on the IMR are interference. In addition, an IMR matches one of A to H to which muting (zero power CSI-RS) may be applied. For example, if the eNB configure the radio resource of B as IMR in FIG. 2, the UE performs interference measurement on the radio resource of B in every RB.

Typically, in the FD-MIMO using a plurality of transmit antennas, the number of CSI-RSs has to increases in proportion to the number of transmit antennas. In an exemplary case of LTE/LTE-A using 8 transmit antennas, the eNB has to transmit CSI-RSs of 8 ports to the UE for downlink channel state measurement. At this time, in order to transmit 8-port CSI-RSs, 8 REs has to be allocated for CSI-RS transmission in one RB. For example, the REs indicated by alphabets A and B can be used for CSI-RS transmission of the corresponding eNB. In the case of applying CSI-RS transmission scheme of LTE/LTE-A to FD-MIMO, the CSI-RS transmission resource increases in proportion to the number of transmit antenna. For example, the eNB having 128 transmit antennas has to transmit CSI-RS on 128 REs in one RB. Such a CSI-RS transmission scheme consumes excessive radio resources and thus causes shortage of resource for data transmission.

Exemplary embodiments of the present invention are described with reference to the accompanying drawings. Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted, or simplified in the drawings and the elements may have sizes and/or shapes different from those shown in drawings, in practice. The same reference numbers are used throughout the drawings to refer to the same or like parts.

Advantages and features of the present invention and methods of accomplishing the same may be understood more readily by reference to the following description of exemplary embodiments and the accompanying drawings.

Exemplary embodiments of the present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and exemplary embodiments of the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to exemplary embodiments of the present invention, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

It can be considered for the eNB having a plurality of transmit antennas for FD-MIMO to transmit CSI-RSs on N dimensions such that the UE performs channel measurements for the plurality of transmit antennas without excessive resource allocation for CSI-RS transmission. In the exemplary case of FIG. 1 where the transmit antennas 110 of the eNB are arranged 2-dimensionally, the CSI-RSs may be transmitted as separated into 2 dimensions. In this case, one CSI-RS is used as a horizontal CSI-RS for acquiring the horizontal direction channel information while the other CSI-RS is used as a vertical CSI-RS for acquiring vertical direction channel information.

Figure 3:
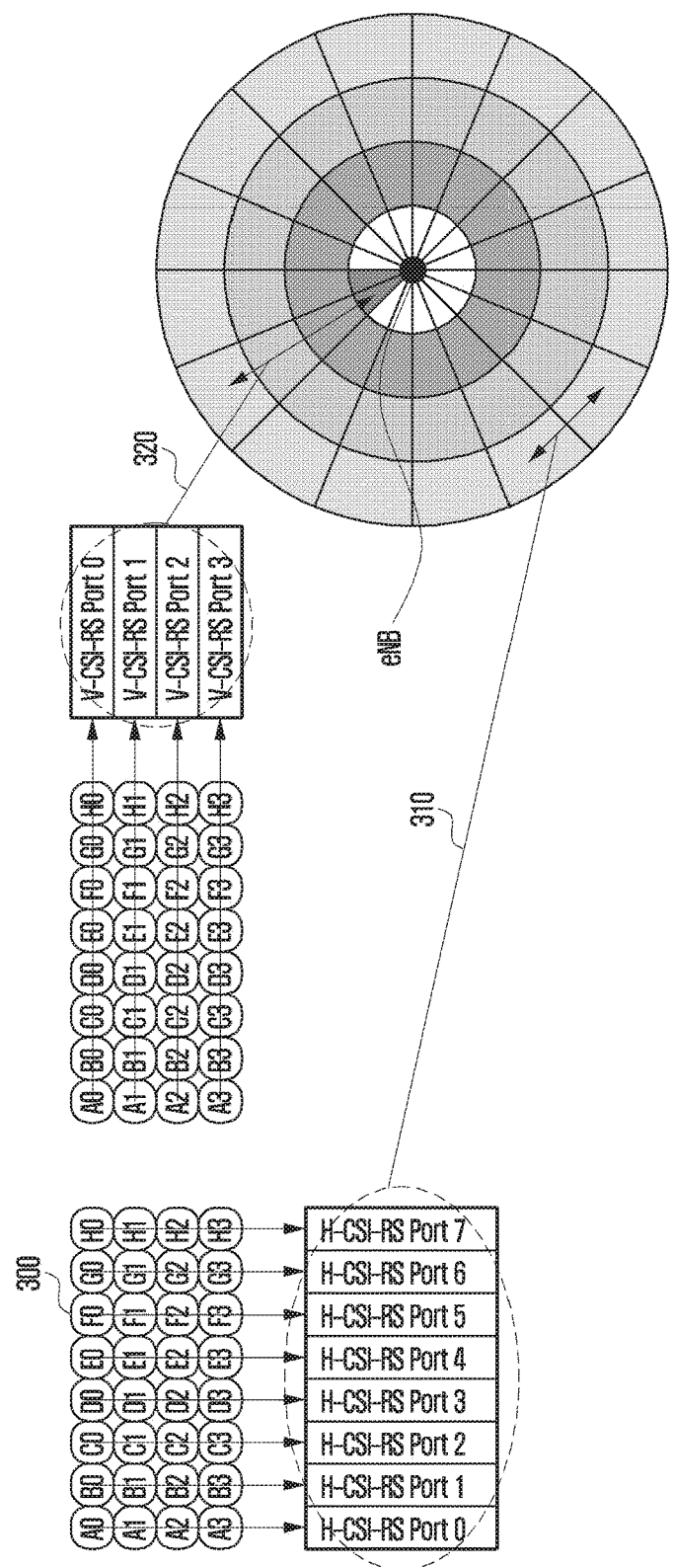
FIG. 3 is a diagram illustrating a mechanism of a Channel Status Information Reference Signal (CSI-RS) transmission in an FD-MIMO system according to an exemplary embodiment of the present invention.

FIG. 3 is a diagram illustrating a mechanism of a CSI-RS transmission in an FD-MIMO system according to an exemplary embodiment of the present invention.

Referring to FIG. 3, the eNB operating in FD-MIMO mode has a total of 32 antennas 300. Although the number of antennas may vary depending on the exemplary embodiment, FIG. 3 is directed to the exemplary case where the number of antennas is 32. In FIG. 3, the 32 antennas 300 are indicated by A0, . . . , A3, B0, . . . , B3, C0, . . . , C3, D0, . . . , D3, E0, . . . , E3, F0, . . . , F3, G0, . . . , G3, and H0, . . . , H3. Two CSI-RSs are transmitted through the 32 antennas. The antenna ports corresponding to a Horizontal-CSI-RS (H-CSI-RS) for use in measuring horizontal channel state consist of the following 8 antenna ports.

1. H-CSI-RS port 0: group of antennas A0, A1, A2, and A3.
2. H-CSI-RS port 1: group of antennas B0, B1, B2, and B3.
3. H-CSI-RS port 2: group of antennas C0, C1, C2, and C3.
4. H-CSI-RS port 3: group of antennas D0, D1, D2, and D3.
5. H-CSI-RS port 4: group of antennas E0, E1, E2, and E3.
6. H-CSI-RS port 5: group of antennas F0, F1, F2, and F3.
7. H-CSI-RS port 6: group of antennas G0, G1, G2, and G3.
8. H-CSI-RS port 7: group of antennas H0, H1, H2, and H3.

The expression of grouping a plurality of antennas into one CSI-RS port is a concept including antenna virtualization. Typically, the antenna virtualization is through a linear combination of the plurality of antennas. The antenna ports corresponding to a Vertical-CSI-RS (V-CSI-RS) for use in measuring vertical channel state consist of the following 4 antenna ports.

1. V-CSI-RS port 0: group of antennas A0, B0, C0, D0, E0, F0, G0, and H0.
2. V-CSI-RS port 1: group of antennas A1, B1, C1, D1, E1, F1, G1, and H1.
3. V-CSI-RS port 2: group of antennas A2, B2, C2, D2, E2, F2, G2, and H2.
4. V-CSI-RS port 3: group of antennas A3, B3, C3, D3, E3, F3, G3, and H3.

It is assumed that the plurality of antennas are arranged in 2 dimensions as described above. The antennas are arranged orthogonally forming M rows in the vertical direction and N columns in the horizontal direction. In this case, the UE is capable of measuring FD-MIMO channels using N H-CSI-RS ports and M V-CSI-RS ports. As aforementioned, if two CSI-RSs are used, the channel state information can be acquired using M+N CSI-RS ports for M×N transmit antennas. Since the channel information on the large number of transmit antennas is acquired using relatively small number of CSI-RS ports, it is advantageous in reducing the CSI-RS overhead. Although the description is directed to the case where the channel information on the FD-MIMO transmit antennas using two CSI-RSs, this approach can be applied to the cases of using two or more CSI-RSs.

In FIG. 3, the RSs of the 32 transmit antennas are mapped to 8 H-CSI-RS ports and 4 V-CSI-RS ports, and the UE measures the radio channels using the CSI-RSs of the FD-MIMO system. The H-CSI-RS can be used for estimating the horizontal angle between the UE and the eNB transmit antennas 310, while the V-CSI-RS can be used for estimating the vertical angle between the UE and the eNB transmit antennas 320.

Grouping multiple antenna elements into a single CSI-RS port means that the grouped antenna elements contribute to the transmission of the CSI-RS port. Multiple antenna elements contributing to the transmission of a single CSI-RS antenna port is beneficial compared to having only one of the multiple antenna elements transmit for the rest of the antenna elements in the following aspects:

More transmission energy can be accumulated compared to having only one antenna element transmit for the rest of the antenna elements, Single CSI-RS antenna port can more effectively represent the grouped antenna elements since the entire antenna elements are contributing to the CSI-RS antenna port compared to only one antenna element transmitting for the rest of the antenna elements. It is advantageous for the UE to measure the averaged channel state and reports the channel state information acquired based on the averaged channel state in view of system performance.

As shown in FIG. 3, depending on the total number of antenna elements, different number of antenna elements can contributed to either the H-CSI-RS port or V-CSI-RS port. In the exemplary embodiment of FIG. 3, 4 antenna elements contribute to a single H-CSI-RS port while 8 antenna elements contribute to single V-CSI-RS port. Since different number of antennas contribute to an H-CSI-RS port and a V-CSI-RS port, different transmission powers are allocated for the H-CSI-RS port and V-CSI-RS port. Typically, the more the antenna contribute, the higher the transmission power is.

In the case of estimating the downlink channel state using H-CSI-RS and V-CSI-RS, it is necessary for the use to know the power difference between H-CSI-RS port and the V-CSI-RS port. This is because the UE can determine the channel state of horizontal and vertical direction channel state accurately based on the accurate transmission power ratio information. In the exemplary embodiment of FIG. 3, the transmission power for the H-CSI-RS port is half of V-CSI-RS port, i.e., vertical-to-horizontal transmission power ratio of 2:1. Without the knowledge of the transmission power ratio of 2:1 between V-CSI-RS port and H-CSI-RS port, it may be shown the horizontal direction channel state is better than the vertical direction channel state, although it is not true. In order to prevent the UE for experiencing this channel distortion effect, there is a need of a method for the UE to determine the transmission power ratio between the H-CSI-RS port and V-CSI-RS port. An exemplary embodiment of the present invention proposes two methods for determining the transmission power ratio between H-CSI-RS port and V-CSI-RS port.

Exemplary Method 1 for Determining a Transmission Power Ratio Between H-CSI-RS and V-CSI-RS Ports In exemplary method 1, a UE receives the transmission power ratio of a V-CSI-RS port and H-CSI-RS port through explicit signaling and determines the numbers of ports for V-CSI-RS and H-CSI-RS based on the signaling. If the number of ports for V-CSI-RS is $n_v$ and H-CSI-RS is $n_h$, the UE implicitly assumes that the ratio between V-CSI-RS port power and H-CSI-RS port power, $P_h:P_v$, is $n_h:n_v$. Here, $P_v$ denotes the transmission power of the V-CSI-RS port, and $P_h$ denotes the transmission power of the H-CSI-RS port. In the exemplary case of FIG. 3, since there are 8 H-CSI-RS ports and 4 V-CSI-RS ports, the UE assumes that the ratio of V-CSI-RS port power and H-CSI-RS port power are 2:1. For example, the UE determines at least one of a channel state and feedback information under the assumption that the V-CSI-RS port transmission power is twice of the H-CSI-RS transmission power.

In exemplary method 1, the transmission power ratio between V-CSI-RS port and H-CSI-RS port is determined as follows:

Step 1: The eNB notifies the UE of the configuration on the V-CSI-RS and H-CSI-RS. In this process, the eNB notifies the UE of the number of V-CSI-RS ports ($n_v$) and H-CSI-RS ports ($n_h$) through higher layer signaling.

In step 1, the eNB may further notify the UE that the V-CSI-RS and H-CSI-RS are of a single eNB. Such indication may be required if a UE is required to perform measurement for multiple eNBs. An explicit indication can be conveyed to the UE for this notification or the UE may derive this notification based on other parameters. For example, if the virtual or physical cell ID value for the determination of the CSI-RS scrambling sequence is the same, the UE may assume that two CSI-RSs are the V-CSI-RS and H-CSI-RS of the same eNB. For example, if the virtual cell ID used by the eNB in determining the initial state for use in generating scrambling sequence of V-CSI-RS and H-CSI-RS is identical, the UE determines that the V-CSI-RS and H-CSI-RS are transmitted by the same eNB. The signal transmitted by the same eNB may be used for determining the numbers of V-CSI-RS and H-CSI-RS ports.

Step 2: Based on the signaled value of $n_h$ and $n_v$, the UE implicitly determines the ratio between V-CSI-RS port power and H-CSI-RS port power, $P_h:P_v$, is $n_h:n_v$.

In exemplary method 1, the ratio between V-CSI-RS port power and H-CSI-RS port power can be used in conjunction with the value $P_c$ defined in the LTE/LTE-A Release 10 specification. In LTE/LTE-A, the UE receives $P_c$ which notifies of ratio between PDSCH transmission power and CSI-RS transmission power. By applying $P_c$ to the measurement of CSI-RS, the UE determines the expected SNIR (signal to noise and interference ratio) on the PDSCH. $P_c$ can be applied in using the ratio between the V-CSI-RS port transmission power and V-CSI-RS port transmission power in exemplary method 1. In this case the UE measures SINR with V-CSI-RS and H-CSI-RS using the transmission power ratio between the V-CSI-RS port and H-CSI-RS port. Afterward, the UE calculates SINR of PDSCH using SINR.

Exemplary Method 2 for Determining a Transmission Power Ratio Between H-CSI-RS and V-CSI-RS Ports In exemplary method 2, a UE determines the transmission power ratio of a V-CSI-RS port and H-CSI-RS port based an explicit higher layer signaling from the eNB. There are two different methods for signaling this information.

Exemplary method 2-1: The eNB notifies the UE of $$\frac{P_h}{P_v}.$$

Exemplary method 2-2: The eNB notifies the UE of $$P_{c,h} = \frac{P_h}{P_d} \text{ and } P_{c,v} = \frac{P_v}{P_d}$$

respectively. $P_d$ denotes a PDSCH transmission power. The UE receives $P_{c,h}$ and $P_{c,v}$ and calculates the ratio between H-CSI-RS port transmission power and V-CSI-RS port transmission power based on $P_{c,h}$ and $P_{c,v}$.

In exemplary method 2, the transmission power ratio between the H-CSI-RS port and V-CSI-RS port are determined as follows:

Step 1: The eNB sends the UE V-CSI-RS and H-CSI-RS configuration through higher layer signaling. In the process, the eNB notifies the UE of $$\frac{P_h}{P_d} \text{ and } \frac{P_v}{P_d}.$$

Step 2: The UE determines the ratio of V-CSI-RS port power and H-CSI-RS port power based on the signaled value of $$\frac{P_h}{P_d} \text{ and } \frac{P_v}{P_d}.$$

In order to report the channel state information for FD-MIMO, there is a need of an efficient channel state information feedback method as well as the method for determining a transmission power ratio between H-CSI-RS port and V-CSI-RS port. For example, the UE has to perform channel estimation for the horizontal and vertical dimension channel estimations based on the V-CSI-RS and H-CSI-RS and report the channel estimation results to the eNB effectively and efficiently.

Figure 4:
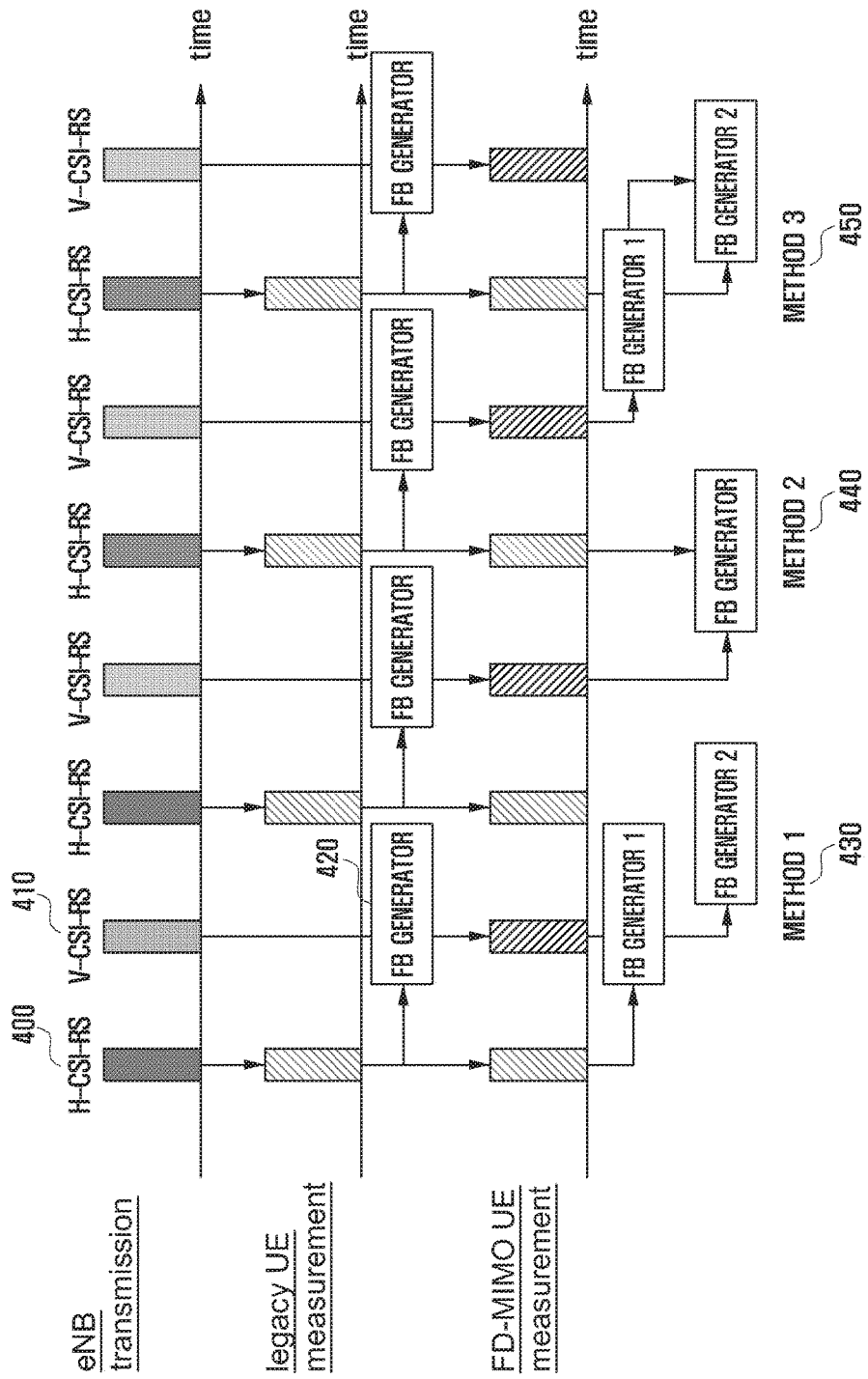
FIG. 4 is a diagram illustrating a procedure of estimating channels based on a Horizontal-CSI-RS (H-CSI-RS) and a Vertical-CSI-RS (V-CSI-RS) and generating channel state information according to an exemplary embodiment of the present invention.

FIG. 4 is a diagram illustrating a procedure of estimating channels based on H-CSI-RS and V-CSI-RS and generating channel state information according to an exemplary embodiment of the present invention.

Referring to FIG. 4, the eNB transmits H-CSI-RS and V-CSI-RS alternatively. Reference number 400 denotes H-CSI-RS and reference number 410 denotes V-CSI-RS. The eNB transmitting the H-CSI-RS and V-CSI-RS for FD-MIMO transmission is capable of transmitting data to both the FD-MIMO-capable UE and non-FD-MIMO-capable UE. In order to accomplish this, the eNB has to discriminate between the channel state information transmitted by the FD-MIMO-capable UE and the non-FD-MIMO-capable UE. In an exemplary embodiment of the present invention, the H-CSI-RS 400 and V-CSI-RS 410 may be transmitted at the same timing.

In FIG. 4, the eNB configures such that the non-FD-MIMO-capable UE measures only one of H-CSI-RS and V-CSI-RS. For example, it is possible to instruct the non-FD-MIMO-capable UE to measure H-CSI-RS and report CSI ad denoted by reference number 420. In the case of operating the FD-MIMO with the channel state information acquired based on only one of the H-CSI-RS and V-CSI-RS, it is difficult to expect the best FD-MIMO performance. Nevertheless, it allows for data transmission. Meanwhile, the FD-MIMO-capable UE measures both the H-CSI-RS and V-CSI-RS and thus, it is possible to acquire improved system performance.

There are three methods for the UE to generate channel state information. The first method is to measure the H-CSI-RS and V-CSI-RS respectively and acquire the respective horizontal and vertical dimension channel state information from the H-CSI-RS and V-CSI-RS as denoted by reference number 430. The second method is to measure the H-CSI-RS and V-CSI-RS respectively and acquire a single set of channel state information as denoted by reference number 440. The third method is to measure the H-CSI-RS and V-CSI-RS respectively, acquire the channel state information based on one of the H-CSI-RS and V-CSI-RS, and the channel state information based on the other as denoted by reference number 450. In the case of the method denoted by reference number 450, the first channel state information is acquired based on the V-CSI-RS and the second channel state information is acquired using the H-CSI-RS in addition.

The three channel state information generation methods can be summarized as follows:

CSI Generation Exemplary Method 1

In this method, the channel state information of H-CSI-RS and V-CSI-RS are determined individually. For example, the channel state information based on H-CSI-RS does not impact the result of the channel state information based on V-CSI-RS and vice versa. This method generates two sets of channel state information that are individually optimized in the horizontal or vertical direction but not both. The UE measures H-CSI-RS and determines the channel state information based on H-CSI-RS without consideration for V-CSI-RS. Additionally, the UE measures V-CSI-RS and determines the channel state information based on V-CSI-RS without consideration for H-CSI-RS. However, either of the two sets of channel state information may not be optimized for the 2 dimensional channel considering the horizontal and vertical direction channels integrally.

This method is advantageous in that the erroneous reception of one of the set of channel state information does not impact the other set of channel state information. For example, although it fails to receive the channel status information of the horizontal direction, the eNB always has the option of falling back to the channel status information in the vertical direction.

CSI Generation Exemplary Method 2

In this method, the channel state information based on H-CSI-RS and V-CSI-RS are determined together as single set of channel state information. This method generates a single set of channel state information that is optimized for both the horizontal and vertical direction. The UE measures the H-CSI-RS and V-CSI-RS and determines the channel state information in consideration of both dimensions. The drawback of this method is high channel state information determination complexity. This is because the optimization has to be performed in the dimension of $n_h+n_v$ in order to take the vertical and horizontal direction channels into consideration in the case that there are $n_h$ H-CSI-RS and $n_v$ V-CSI-RS ports. Typically, the complexity of optimization performed to $n_h$ and $n_v$ separately is lower than that performed to $n_h+n_v$.

CSI Generation Exemplary Method 3

In this method, the channel state information based on one of H-CSI-RS and V-CSI-RS is determined first and the channel state information based on the remaining CSI-RS is determined. For example, the H-CSI-RS would be measured first and the corresponding channel state information is determined. In addition, the UE generate additional channel state information in consideration of both the horizontal and vertical directions using the channel state information acquired based on the H-CSI-RS and the V-CSI-RS.

In addition to using one of the three methods, any combination of three methods can be used. For example, exemplary method 1 can be used to provide the individual channel state information on the horizontal and vertical direction. In addition to the individual channel state information on both directions, an additional set of information that are determined by measuring both H-CSI-RS and V-CSI-RS can be defined. The purpose of the additional set of information is to provide accurate channel status information for the case where both antenna ports are activated on both dimensions for a UE.

An exemplary embodiment of the present invention proposes a channel state information feedback method under the assumption that the H-CSI-RS and V-CSI-RS are transmitted for channel measurement in the horizontal and vertical directions. Although the description is directed to the methods assuming a certain timing, the general concept is applicable to diverse timing cases.

The following abbreviations are used throughout the specification.

$RI_H$: a Rank Indicator (RI) generated based on H-CSI-RS for feedback to eNB.

$RI_V$: an RI generated based on V-CSI-RS for feedback to eNB.

$RI_{HV}$: an RI generated based on H-CSI-RS and V-CSI-RS for feedback to eNB.

$PMI_H$: a Precoding Matrix Indicator (PMI) generated based on H-CSI-RS for feedback to eNB.

$PMI_V$: a PMI generated based on V-CSI-RS for feedback to eNB.

$CQI_H$: a UE-recommended data rate generated under the assumption that only the horizontal direction precoding matrix is applied.

$CQI_V$: a UE-recommended data rate generated under the assumption that only the vertical precoding matrix is applied.

$CQI_{HV}$: a UE-recommended data rage generated under the assumption that both the horizontal and vertical precoding matrices are applied.

In the following, the description is directed to the case of using the horizontal direction channel state information and the vertical direction channel state information. In the case that an eNB operates with two or more CSI-RSs, however, other types of channel state information can be further applied in addition to the horizontal and vertical direction channel state information. In an exemplary case where the CSI-RS mapped to an antenna port from the first view point (first CSI-RS) and the CSI-RS mapped to an antenna port from the second view point (second CSI-RS) are used, the UE is capable of acquiring the channel state information (first and second channel state information) based on the two respective CSI-RSs and the channel state information (third channel state information) based on both the CSI-RSs. The configuration described in the following description are application to various exemplary embodiments in similar manner. In the following, the description is directed to the exemplary cases of using V-CSI-RS and H-CSI-RS for the convenience sake.

In the following description, the channel state information corresponding to the vertical direction CSI-RS is referred to as vertical direction channel state information. The vertical direction channel state information includes at least one of RI, PMI, and CQI acquired based on the vertical direction CSI-RS.

In the following description, the channel state information corresponding to the horizontal direction CSI-RS is referred to as horizontal direction channel state information. The horizontal channel state information includes at least one of an RI, a PMI, and a CQI acquired based on the horizontal direction CSI-RS.

In the case that the eNB sends the UE two or more CSI-RSs, the UE is capable of transmitting the channel state information corresponding to the respective CSI-RSs. Each of the channel state information includes at least one of an RI, a PMI, and a CQI. However, the UE may acquire the channel state information based on the two or more CSI-RSs in an exemplary embodiment of the present invention. In this case, how the channel state information is acquired is described explicitly.

In an exemplary embodiment of the present invention, the UE may notify of the vertical direction precoding and horizontal direction precoding separately to determine the precoding for the case of using both the vertical and horizontal direction precodings. It is necessary to define how to determine CQI in the case that a plurality of precodings are applied. In the case that two precodings are applied to downlink simultaneously, it can be considered as Kronecker product of the two precodings. The Kronecker product is defined with two matrices as follows:

$$A \otimes B = \begin{bmatrix} a_{11}B & \cdots & a_{1n}B \\ \vdots & \ddots & \vdots \\ a_{m1}B & \cdots & a_{mn}B \end{bmatrix}, \quad \text{Equation (1)}$$

In Equation (1), A and B denote matrices, and $a_{11}$ to $a_{mn}$ denote elements of matrix A. $a_{ij}$ denotes the element at $i^{th}$ row and $j^{th}$ column.

CSI Feedback Exemplary Method 1

Figure 5:
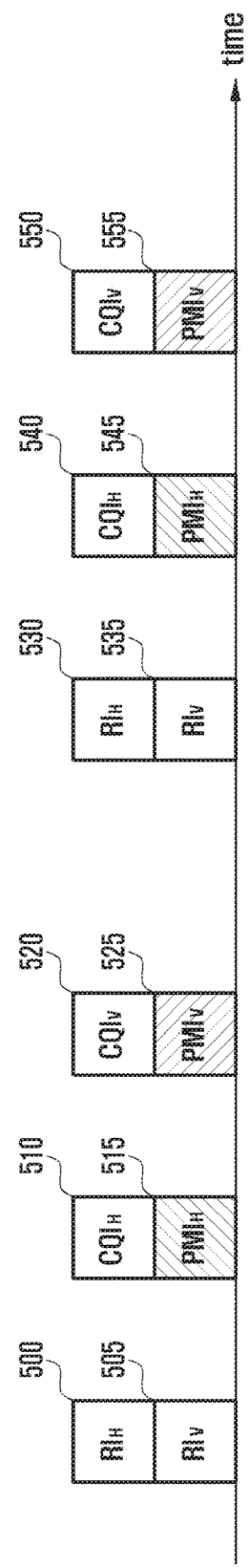
FIG. 5 is a timing diagram illustrating a channel state information feedback method 1 according to an exemplary embodiment of the present invention.

FIG. 5 is a timing diagram illustrating a channel state information feedback method 1 according to an exemplary embodiment of the present invention.

Referring to FIG. 5, in the channel state information feedback method, the UE generates two sets of channel state information to the eNB. The two sets of channel state information are generated based on the H-CSI-RS and V-CSI-RS transmitted by the eNB. As shown in FIG. 5, a first set of channel state information consists of $RI_H$ 500, $CQI_H$ 510, and $CQI_V$ 520. For example, the UE generates horizontal direction RI, PMI, and CQI based on the H-CSI-RS and vertical direction $RI_V$ 505, $PMI_H$ 515, and $PMI_V$ 525 based on the V-CSI-RS. A second set of channel state information consists of $RI_H$ 530, $CQI_H$ 540, and $CQI_V$ 550. For example, the UE generates horizontal direction RI, PMI, and CQI based on the H-CSI-RS and vertical direction $RI_V$ 535, $PMI_H$ 545, and $PMI_V$ 555 based on the V-CSI-RS.

In LTE, CQI may indicate UE's maximum receivable data rate or spectral efficiency. In radio communication system including LTE, the UE generates one CQI to the eNB for RI set 1 and two or more CQIs for RI set to 2 or higher. Assuming that CQI is transmitted, if RI is set to 2 or higher, this means that the corresponding CQI has two CQI values. In FIG. 5, if $RI_H$ 500 is set to 2, the $CQI_H$ 510 consists of two CQI values.

In FIG. 5, the UE measures H-CSI-RS and V-CSI-RS to generate and send $RI_H$ 500 and $RI_V$ 505 to the eNB. If the preferred precoding is determined by measuring H-CSI-RS and if the determined precoding is applied, the maximum data rate or spectral efficiency is determined. The UE notifies the eNB of the determined preferred precoding and maximum data rate or spectral efficiency using PMI 510 and CQI 515. The UE also sends the eNB the PMI 520 and CQI 525 acquired based on V-CSI-RS.

If the two sets of channel state information are received from the UE, the eNB determines the precoding of PDSCH to be transmitted to the UE based on the precoding-related channel state information. For example, the eNB determines the precoding matrix to be applied to PDSCH to be transmitted in downlink based on $PMI_H$ and $PMI_V$ transmitted by the UE.

The CQI transmitted by the UE is generated under the assumption of a certain precoding to be applied at the eNB. In LTE, the UE sends PMI to the eNB to notify of the recommended precoding, and CQI indicates UE-recommended maximum data rate or spectral efficiency in the case that the corresponding PMI is applied at the eNB. In the case that two CSI-RSs exist and the precoding is applied in horizontal and vertical directions simultaneously, it is necessary to define new CQI. $CQI_H$ can be defined as one of the followings.

$CQI_H$ definition 1: The UE generates $CQI_H$ regardless of the presence of vertical direction antennas. For example, the UE generates $CQI_H$ only based on H-CSI-RS but not V-CSI-RS. More specifically, the UE generates its best $PMI_H$ based on the H-CSI-RS and notifies the eNB of the maximum data rate or spectral efficiency, when the corresponding PMI is applied, by transmitting $CQI_H$.

$CQI_H$ definition 2: The UE generates $CQI_H$ under the assumption of fixed precoding in the vertical direction. For example, the UE generates $CQI_H$ under the assumption that a fixed rank 1 precoding is applied to the vertical direction antennas. This $CQI_H$ generation is identical with determining CQI under the assumption that the precoding of $G_{HV}=G_H \otimes G_V$ to which both the horizontal and vertical direction precodings are applied. In $G_{HV}=G_H \otimes G_V$, $G_H$ denotes the horizontal direction precoding fed back from the UE to the eNB using $PMI_H$, and $G_V$ denotes the fixed vertical direction rank 1 precoding. In addition, $\otimes$ denotes Kronecker product. The fixed vertical direction precoding can be the precoding specified in the standard or notified to the UE by eNB through higher layer signaling.

$CQI_H$ definition 3: The UE generates $CQI_H$ under the assumption that the precoding negotiated with the eNB in the vertical direction is applied. For example, the eNB and the UE assume that vertical direction precoding is one of a plurality of precoding candidates and determined according to the method negotiated therebetween. For example, assuming vertical direction precoding candidates of $\{G_{V1}, G_{V2}, G_{V3}, G_{V4}\}$, when generating $CQI_H$, the UE assumes vertical direction precoding of $G_{V1}$ at time 1, assumes vertical direction precoding of $G_{V2}$ at time 2, assumes vertical direction precoding of $G_{V3}$ at time 3, and assumes vertical direction precoding of $G_{V4}$ at time 4 according to the pre-negotiated method. The vertical direction precoding can be changed in time domain or frequency domain. In the case that the vertical direction precoding is changed in the frequency domain, the UE divides the system bandwidth assumes that a specific vertical direction precoding is applied to a specific frequency band and other vertical direction precodings are applied to other frequency bands. For example, CQI is generated under the assumption that the precoding represented by $G_{HV}=G_H \otimes G_{V(i)}$ is applied. In $G_{HV}=G_H \otimes G_{V(i)}$ is one of the precodings assumable in the vertical direction. The change $G_{V(i)}$ can be determined through cyclic rotation in the given set of $G_{V(i)}$.

The $CQI_H$ definition methods can be applied to $CQI_V$.

The drawback of exemplary channel state information feedback method 1 is that, although the UE recommends its preferred vertical and horizontal direction precodings to the eNB, not both the two precodings are applied to the CQI generation. For example, the UE does not report the CQI acquired when the best vertical and horizontal direction precodings are applied and thus, although the eNB transmits PDSCH with the best vertical and horizontal direction precodings, it is difficult the data rate supported by the UE. Although the eNB may determine the data rate when the best vertical and horizontal direction precodings are applied with the compensation of $CQI_H$ or $CQI_V$ in itself, the determined data rate may differ from the data rate supportable by the UE. Such a mismatch occurs because the eNB does not know the receiver structure of the UE.

CSI Feedback Exemplary Method 2

Figure 6:
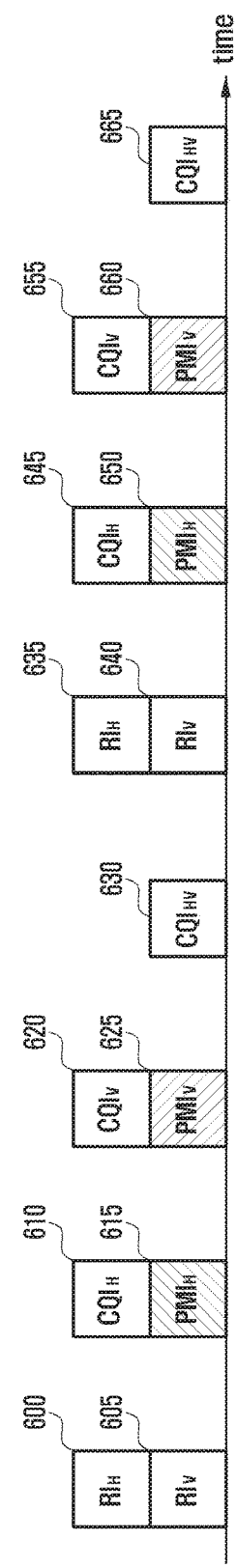
FIG. 6 is a timing diagram illustrating a channel state information feedback method 2 according to an exemplary embodiment of the present invention.

FIG. 6 is a timing diagram illustrating a channel state information feedback method 2 according to an exemplary embodiment of the present invention.

Referring to FIG. 6, in the channel state information feedback method, the UE generates two sets of channel state information to the eNB as in the feedback method of FIG. 5. In the exemplary channel state information method 2, however, $CQI_{HV}$ 630 (665) is further transmitted to the eNB. The $CQI_{HV}$ 630 (665) is the information on the maximum data rate or spectral efficiency supportable by the UE when the best vertical and horizontal direction precodings are applied. The UE generates $CQI_{HV}$ 630 under the assumption that the precoding determined according to the $RI_H$ 600 and $PMI_H$ 615 based on H-CSI-RS and $RI_V$ 605 and $PMI_V$ 625 based on V-CSI-RS is applied. A first set of channel state information consists of $RI_H$ 600, $CQI_H$ 610, and $CQI_V$ 620. A second set of channel state information consists of $RI_H$ 635, $CQI_H$ 645, and $CQI_V$ 655. For example, the UE generates horizontal direction RI, PMI, and CQI based on the H-CSI-RS and vertical direction $RI_V$ 640, $PMI_V$ 650, and $PMI_V$ 660 based on the V-CSI-RS. For example, $CQI_{HV}$ 630 (665) is the information on the maximum data rate or spectral efficiency when the UE-recommended vertical and horizontal direction precodings are applied simultaneously. This method is advantageous in improvement of system performance since the UE sends the eNB the information on the case where the best vertical and horizontal precodings are applied simultaneously.

In the case that the UE transmits $CQI_{HV}$ 630 (665) as shown in the exemplary embodiment of FIG. 6, one issue to be considered is how to determine RI. In LTE, the UE transmits one RI for use in one CSI process to notify the eNB that how many spatial layers the UE is supportable. One problem associated with RI in FIG. 6 is that two RIs ($RI_H$ and $RI_V$) exist. This is because it is necessary to define the rank in order to report accurate $CQI_{HV}$ 630 (665) even when the vertical and horizontal direction precodings are applied and there are two RIs redundantly.

$RI_{HV}$ definition exemplary method 1: $RI_{HV}=RI_H \times RI_V$.

$RI_{HV}$ definition exemplary method 2: $RI_{HV}=\max(RI_H, RI_V)$.

$RI_{HV}$ definition exemplary method 3: $RI_{HV}=\min(RI_H, RI_V)$.

$RI_{HV}$ definition exemplary method 4: $RI_{HV}=RI_H$ or $RI_{HV}=RI_V$.

In $RI_{HV}$ definition exemplary method 1, $RI_{HV}$ is defined as the product of $RI_H$ and $RI_V$. The precoding for this case is obtained by the Kronecker product of the precoding matrices indicated by $PMI_H$ and $PMI_V$. Therefore, the precoding for the case of exemplary method 1 is defined as $G_{HV}=G_V \otimes G_H$ or $G_{HV}=G_H \otimes G_V$ where $G_H$ and $G_V$ are the precoding matrices indicated by $PMI_H$ and $PMI_V$, respectively.

In $RI_{HV}$ definition of exemplary method 2, $RI_{HV}$ is defined as the maximum of $RI_H$ and $RI_V$. The precoding for this case is again obtained by the Kronecker product of the precoding matrices. However, since $RI_{HV}$ is defined as the maximum of $RI_H$ and $RI_V$, not all the columns of the precoding matrix with the lower rank can be used for the definition of $G_{HV}$. Therefore, If $RI_H \geq RI_V$, the precoding for the $RI_{HV}$ definition of exemplary method 2 is defined as $G_{HV}=G_V' \otimes G_H$ or $G_H \otimes G_V'$ where $G_V'$ is the precoding matrix on the vertical dimension obtained by selecting 1 column out of the $RI_V$ columns of $G_V$. The column to be selected is fixed or predefined.

If $RI_H<RI_V$, the precoding for the $RI_{HV}$ definition of exemplary method 2 is defined as $G_{HV}=G_V \otimes G_H'$ or $G_H' \otimes G_V$ where $G_H'$ is the precoding matrix on the horizontal dimension obtained by selecting 1 column out of the $RI_H$ columns of $G_H$. The column to be selected is fixed or predefined.

In $RI_{HV}$ definition of exemplary method 3, $RI_{HV}$ is defined as the minimum of $RI_H$ and $RI_V$. The precoding for this case is again obtained by the Kronecker product of the precoding matrices. However, since $RI_{HV}$ is defined as the minimum of $RI_H$ and $RI_V$, not all the columns of the precoding matrix with the higher rank can be used for the definition of $G_{HV}$. Therefore, If $RI_H<RI_V$, the precoding for $RI_{HV}$ definition of exemplary method 3 is defined as $G_{HV}=G_V' \otimes G_H$ or $G_H \otimes G_V'$ where $G_V'$ is the precoding matrix on the vertical dimension obtained by selecting 1 column out of the $RI_V$ columns of $G_V$. The column to be selected is fixed or predefined.

If $RI_H \geq RI_V$, the precoding for $RI_{HV}$ definition of exemplary method 3 is defined as $G_{HV}=G_V \otimes G_H'$ or $G_H' \otimes G_V$ where $G_H'$ is the precoding matrix on the horizontal dimension obtained by selecting 1 column out of the $RI_H$ columns of $G_H$. The column to be selected is fixed or predefined.

In $RI_{HV}$ definition of exemplary method 4, $RI_{HV}$ is defined as either $RI_H$ or $RI_V$. This can be achieved by fixing either $RI_H$ or $RI_V$ to be 1. When either $RI_H$ or $RI_V$ is fixed to the value of 1, its value can be omitted in the channel status information feedback since this information is already known by the eNB. For example, in FIG. 6, if rank in the horizontal direction is fixed as 1, it is not necessary to send $RI_H$ values. Typically, the eNB can inform the UE using higher layer signaling which of the two dimensions should be restricted to a rank of 1. When the rank of one of the dimensions is restricted to one, a simple Kronecker product of this precoding matrix and the other precoding matrix which does not have this restriction will generate $G_{HV}$.

In FIG. 6, $CQI_{HV}$ is related to either $CQI_H$ or $CQI_V$. Although Either $CQI_H$ or $CQI_V$ has the CQI value to which the preferred precoding of either direction is applied, $CQI_{HV}$ has the CQI value to which the preferred precodings of both the vertical and horizontal directions are applied. Typically, $CQI_{HV}$ has a value greater than $CQI_H$ or $CQI_V$. By taking notice of this characteristic, there is a room for reducing the information amount of $CQI_{HV}$. For example, it is possible to notify the eNB of the $CQI_{HV}$ as a relative value to $CQI_H$ or $CQI_V$ other than absolute value of $CQI_{HV}$.

CSI Feedback Exemplary Method 3

Figure 7:
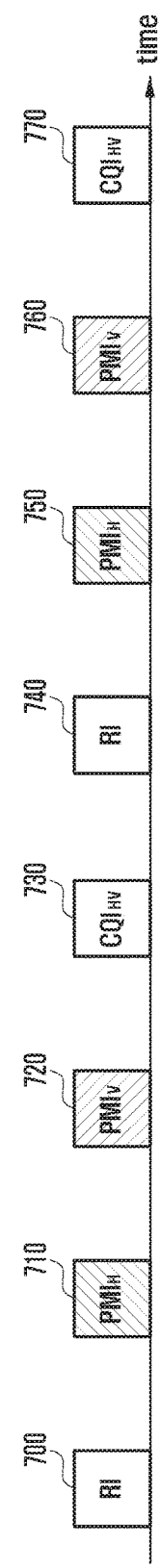
FIG. 7 is a timing diagram illustrating a channel state information feedback method 3 according to an exemplary embodiment of the present invention.

FIG. 7 is a timing diagram illustrating a channel state information feedback method 3 according to an exemplary embodiment of the present invention.

Referring to FIG. 7, the exemplary channel state information feedback method 3 is characterized in that only one RI is transmitted. In FIG. 7, RI 700 (or 740) indicates the number of layers that can be supported by the UE in the vertical or horizontal direction. In the exemplary channel state information feedback method 3, the eNB notifies the UE of the direction in which the rank is fixed to 1, and the UE determines the rank in the direction in which the rank is not fixed and sends the determined RI to the eNB. According to an exemplary embodiment, a specific CQI value may be transmitted at the same timing as the PMI. More specifically, $CQI_{HV}$ 730 (770) may be transmitted at the same timing as one of $PMI_H$ 710 (750) and $PMI_V$ 720 (760).

CSI Feedback Exemplary Method 4

Figure 8:
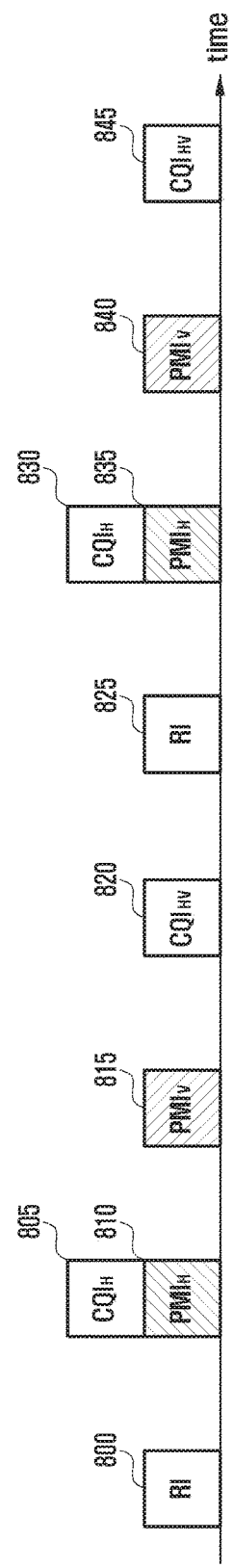
FIG. 8 is a timing diagram illustrating a channel state information feedback method 4 according to an exemplary embodiment of the present invention.

FIG. 8 is a timing diagram illustrating a channel state information feedback method 4 according to an exemplary embodiment of the present invention.

Referring to FIG. 8, in the exemplary channel state information feedback method 4, the UE sends eNB the channel status information generated for the case where the preferred precodings of the vertical and horizontal directions are applied and the channel status information generated for the case where the preferred precoding of either the vertical direction or the horizontal direction.

The exemplary channel state information feedback method 4 aims to provide PMI and CQI on one of vertical and horizontal directions and, on top of this, the channel state information for the case where the preferred precoding is applied for the other direction. In FIG. 8, the UE sends the eNB the channel status information for the horizontal direction. At this time, the horizontal direction channel state information generated by the UE includes $CQI_H$ 805 (830) and $PMI_H$ 810 (835). In addition, the UE transmits the vertical direction preferred precoding information 815 (840) and the $CQI_{HV}$ 820 (845) for the case where the vertical and horizontal direction preferred precodings are applied simultaneously. Similar to the exemplary channel state information feedback method 1, in order to avoid the complexity due to the coexistence of $RI_H$ and $RI_V$, only one direction RI is transmitted. In the exemplary embodiment of FIG. 8, RI 800 (825) is used for notifying the eNB of the vertical direction rank while the horizontal direction rank is fixed to 1. According to an exemplary embodiment, the rank value for the direction with the least channel variation may be fixed to 1.

Figure 9:
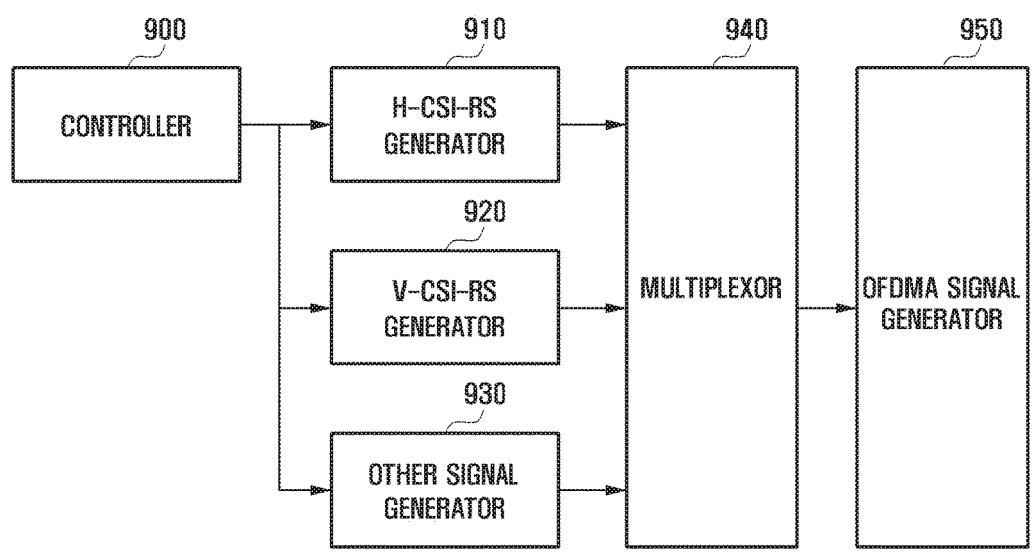
FIG. 9 is a block diagram illustrating a configuration of an evolved Node B (eNB) according to an exemplary embodiment of the present invention.

FIG. 9 is a block diagram illustrating a configuration of an eNB according to an exemplary embodiment of the present invention.

Referring to FIG. 9, the eNB comprises a controller 900, an H-CSI-RS generator 910, a V-CSI-RS generator 920, other signal generator 930, a multiplexor 940, and an OFDMA signal generator 950. The H-CSI-RS generator 910 and the V-CSI-RS generator 920 generate H-CSI-RS and V-CSI-RS respectively under the control of the controller 900. The H-CSI-RS and V-CSI-RS are multiplexed by the multiplexer 940 and transmitted by means of the OFDMA signal generator 950. The eNB may further include a channel state information receiver to receive the channel state information generated based on the H-CSI-RS and V-CSI-RS at the UE. According to an exemplary embodiment, the OFDMA signal generator 950 and the receiver may be included in the eNB in the form of a transceiver for transmitting and receiving signal to and from the UE.

Figure 10:
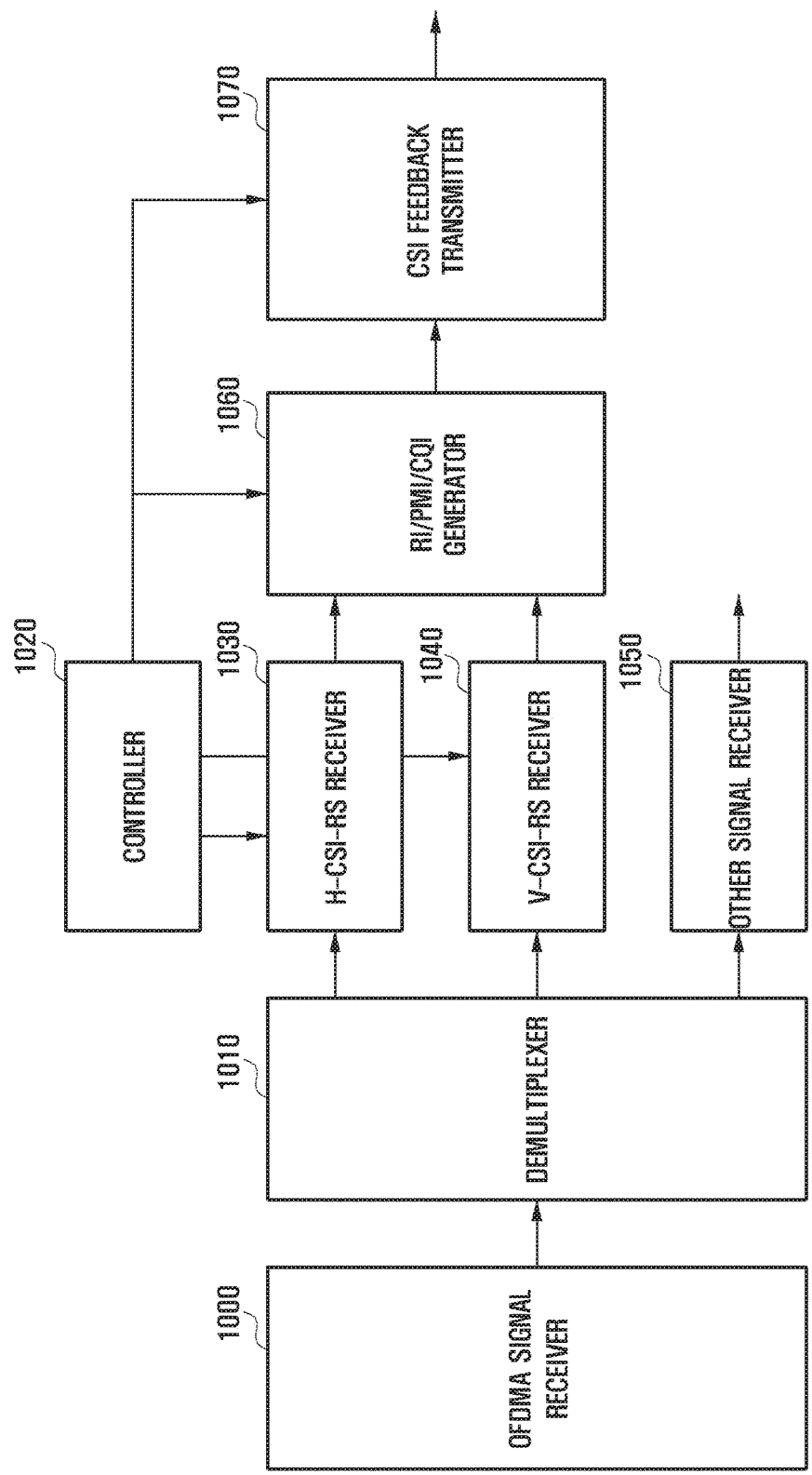
FIG. 10 is a block diagram illustrating a configuration of a User Equipment (UE) according to an exemplary embodiment of the present invention.

FIG. 10 is a block diagram illustrating a configuration of a UE according to an exemplary embodiment of the present invention.

Referring to FIG. 10, the UE includes a controller 1020, an H-CSI-RS receiver 1030, a V-CSI-RS receiver 1040, other signal receiver 1050, a demultiplexer 1010, and an OFDMA signal receiver 1000. The UE further includes an RI/PMI/CQI generator 1060 for generating channel state information (CSI) and a CSI transmitter 1070 for transmitting the channel state information.

The UE receives the signal transmitted by the eNB using the OFDMA signal receiver 1000. The received signal is demultiplexed by the demultiplexer 1010. For example, the demultiplexer 1010 demultiplexes the received signal into H-CSI-RS, V-CSI-RS and other signals and delivers H-CSI-RS, V-CSI-RS and other signals to the H-CSI-RS receiver 1030, V-CSI-RS receiver 1040, and other signal receiver 1050. The H-CSI-RS receiver 1030 and the V-CSI-RS receiver 1040 perform channel measurement based on the received H-CSI-RS and V-CSI-RS respectively, the RI/PMI/CQI generator 1060 generates RI/PMI/CQI based on the measurement result. The RI/PMI/CQI is transmitted to the eNB by the CSI transmitter 1070. According to an exemplary embodiment, the OFDMA receiver 1000 and the channel state information transmitter 1070 may be included in the UE in the form of a transceiver for transmitting and receiving signals to and from the eNB.

Figure 11:
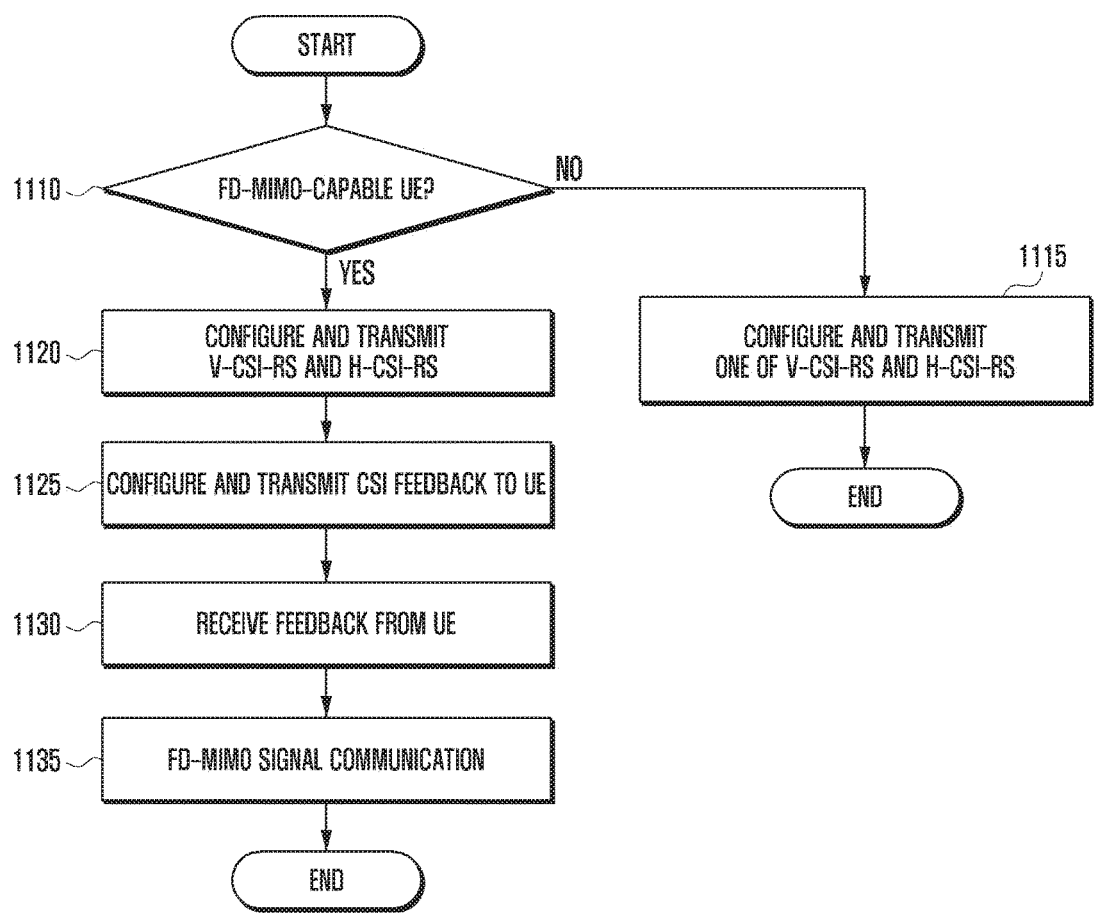
FIG. 11 is a flowchart illustrating an eNB procedure according to an exemplary embodiment of the present invention.

FIG. 11 is a flowchart illustrating an eNB procedure according to an exemplary embodiment of the present invention.

Referring to FIG. 11, the eNB determines whether the UE is a FD-MIMO-capable UE at step 1110. According to an exemplary embodiment of the present invention, the eNB is capable of determining whether the UE has FD-MIMO capability based on signal exchange with the UE or predefined information.

If the UE is non-FD-MIMO-capable UE, the eNB configures one of V-CSI-RS and H-CSI-RS and transmits the configured reference signal to the UE at step 1115.

If the UE is the FD-MIMO-capable UE, the eNB configures both the V-CSI-RS and H-CSI-RS and transmits the configured reference signals to the UE at step 1120.

The V-CSI-RS and H-CSI-RS can be configured according to at least one of the above described configuration methods.

The eNB transmits a CSI-RS feedback configuration to the UE at step 1125. The CSI-RS feedback can be configured according to at least one of the above described configuration methods. According to an exemplary embodiment of the present invention, the eNB may perform the operations of steps 1120 and 1125 simultaneously or separately.

The eNB receives feedback information from the UE at step 1130.

The eNB communicates FD-MIMO signals with the UE at step 1135 based on the feedback information received from the UE at step 1130.

Figure 12:
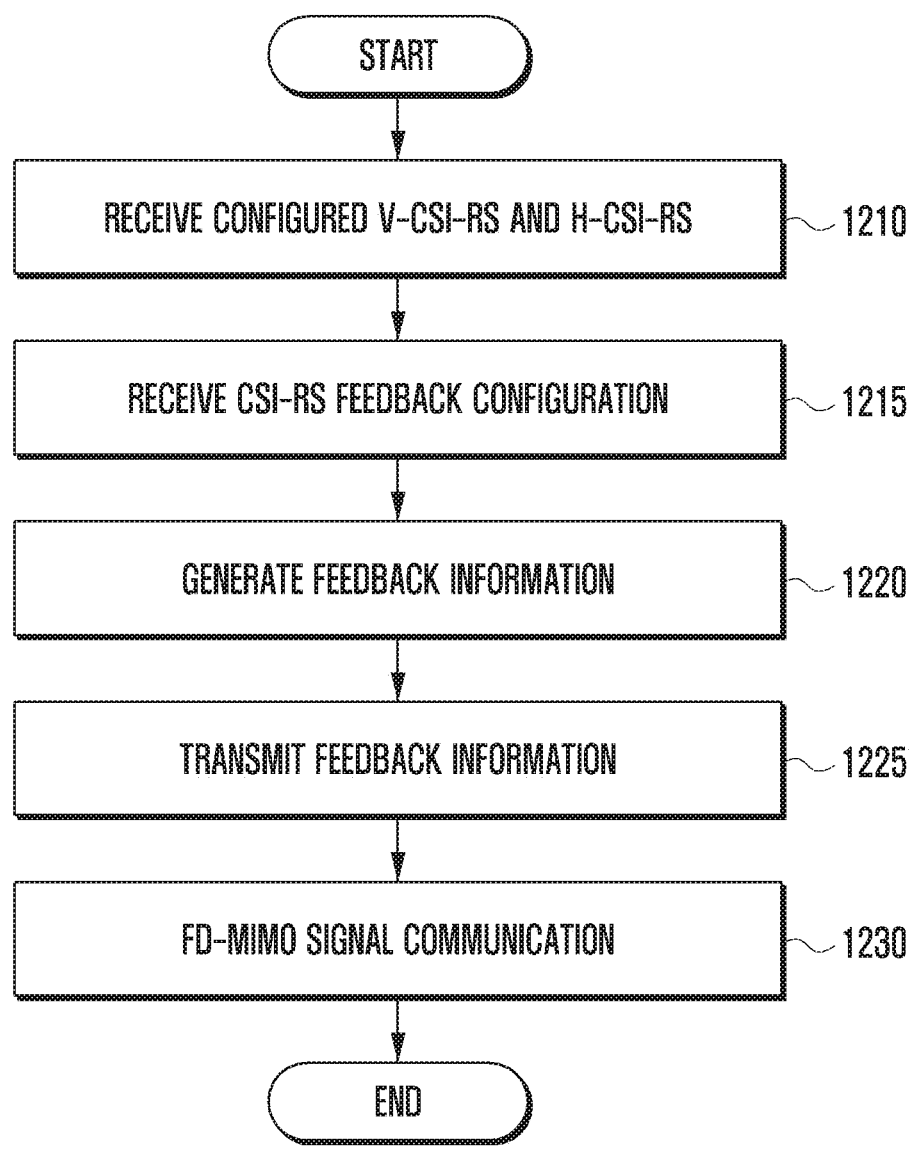
FIG. 12 is a flowchart illustrating a UE procedure according to an exemplary embodiment of the present invention.

FIG. 12 is a flowchart illustrating a UE procedure according to an exemplary embodiment of the present invention.

Referring to FIG. 12, the UE receives at least one of V-CSI-RS and H-CSI-RS from the eNB at step 1210. According to an exemplary embodiment, if it has the FD-MIMO capability, the UE is capable of receiving the V-CSI-RS and H-CSI-RS, and otherwise, only one of the V-CSI-RS and H-CSI-RS. This exemplary embodiment is directed to the case of the UE having the FD-MIMO capability. According to an exemplary embodiment of the present invention, the V-CSI-RS and H-CSI-RS can be configured according to one of the above-described methods.

The UE receives the CSI-RS feedback configuration transmitted by the eNB at step 1215. The CSI feedback can be configured according to one of the above-described methods. In an exemplary embodiment of the present invention, the UE may receive the information of steps 1210 and 1215 simultaneously or separately.

The UE generates feedback information based on at least one of the information received at step 1220.

The UE transmits the feedback information to the eNB at step 1225.

The UE communicates FD-MIMO signals with the eNB at step 1230. The FD-MIMO signals can be transmitted/received based on the feedback information transmitted at step 1225.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a base station in a wireless communication system, the method comprising:
transmitting, to a terminal, at least one reference signal; and
receiving, from the terminal, feedback information including a first precoding matrix indicator and channel quality information, wherein the first precoding matrix indicator is determined based on the at least one reference signal and wherein the channel quality information is determined based on the first precoding matrix indicator and a second precoding matrix indicator selected by the terminal from a set corresponding to a plurality of precoding matrices,
wherein the second precoding matrix indicator is not received from the terminal.

2. The method of claim 1, wherein a precoding matrix assumed by the terminal is determined based on the first precoding matrix indicator and the second precoding matrix indicator.

3. The method of claim 1, wherein one second precoding matrix indicator is selected for each of at least one frequency band from the set.

4. The method of claim 1,
wherein a first precoding matrix for a first frequency band is determined based on the set, and
wherein a second precoding matrix for a second frequency band is determined based on the set.

5. The method of claim 1, wherein one second precoding matrix indicator is selected from the set for each of at least one time interval.

6. The method of claim 1, wherein the set is applied to both the base station and the terminal.

7. A method by a terminal in a wireless communication system, the method comprising:
receiving, from a base station, at least one reference signal;
determining a first precoding matrix indicator based on the at least one reference signal;
selecting a second precoding matrix indicator from a set corresponding to a plurality of precoding matrices;
determining channel quality information based on the first precoding matrix indicator and the second precoding matrix indicator; and
transmitting, to the base station, feedback information including the first precoding matrix indicator and the channel quality information,
wherein the second precoding matrix indicator is not transmitted to the base station.

8. The method of claim 7, wherein the determining of the channel quality information comprises:
determining a precoding matrix based on the first precoding matrix indicator and the second precoding matrix indicator, and
determining the channel quality information based on the determined precoding matrix.

9. The method of claim 7, wherein the selecting of the second precoding matrix indicator comprises selecting one second precoding matrix indicator for each of at least one frequency band from the set.

10. The method of claim 8, wherein the determining of the precoding matrix comprises:

determining a first precoding matrix for a first frequency band based on the set, and determining a second precoding matrix for a second frequency band based on the set.

11. The method of claim 7, wherein the selecting of the second precoding matrix indicator comprises selecting one second precoding matrix indicator from the set for each of at least one time interval.

12. The method of claim 7, wherein the set is applied to both the base station and the terminal.

13. A base station in a wireless communication system, the base station comprising:

a transceiver configured to transmit, to a terminal, at least one reference signal; and a controller configured to control the transceiver to receive, from the terminal, feedback information including a first precoding matrix indicator and channel quality information, wherein the first precoding matrix indicator is determined based on the at least one reference signal and wherein the channel quality information is determined based on the first precoding matrix indicator and a second precoding matrix indicator selected by the terminal from a set corresponding to a plurality of precoding matrices, wherein the second precoding matrix indicator is not received from the terminal.

14. The base station of claim 13, wherein a precoding matrix assumed by the terminal is determined based on the first precoding matrix indicator and the second precoding matrix indicator.

15. The base station of claim 13, wherein one second precoding matrix indicator is selected for each of at least one frequency band from the set.

16. The base station of claim 13, wherein a first precoding matrix for a first frequency band is determined based on the set, and wherein a second precoding matrix for a second frequency band is determined based on the set.

17. The base station of claim 13, wherein the second precoding matrix indicator is selected from the set for each of at least one time interval.

18. The base station of claim 13, wherein the set is applied to both the base station and the terminal.

19. A terminal in a wireless communication system, the terminal comprising:

a transceiver configured to receive, from a base station, at least one reference signal; and a controller configured to:

determine a first precoding matrix indicator based on the at least one reference signal, select a second precoding matrix indicator from a set corresponding to a plurality of precoding matrices, determine channel quality information based on the first precoding matrix indicator and the second precoding matrix indicator, and control the transceiver to transmit, to the base station, feedback information including the first precoding matrix indicator and the channel quality information, wherein the second precoding matrix indicator is not transmitted to the base station.

20. The terminal of claim 19, wherein the controller is further configured to determine a precoding matrix based on the first precoding matrix indicator and the second precoding matrix indicator and determine the channel quality information based on the determined precoding matrix.

21. The terminal of claim 19, wherein the controller is further configured to select one second precoding matrix indicator for each of at least one frequency band from the set.

22. The terminal of claim 20, wherein the controller is further configured to determine a first precoding matrix for a first frequency band based on the set, and determine a second precoding matrix for a second frequency band based on the set.

23. The terminal of claim 19, wherein the controller is further configured to select one second precoding matrix indicator from the set for each of at least one time interval.

24. The terminal of claim 19, wherein the set is applied to both the base station and the terminal.

\* \* \* \* \*